Figure 1:
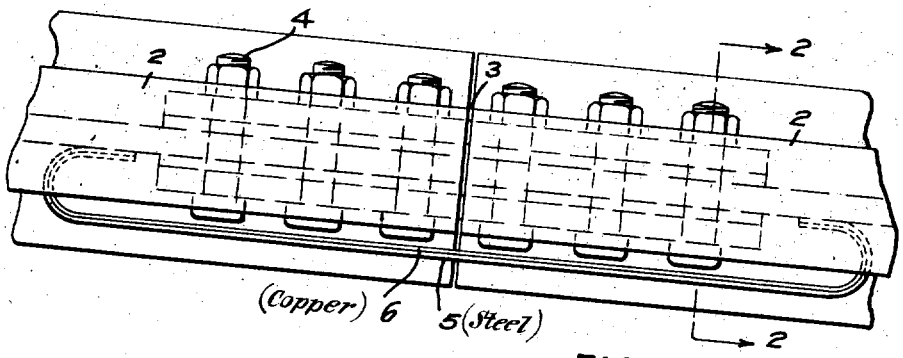

G. A. MERKT.
RAIL BONDING.
APPLICATION FILED FEB. 15, 1917.

Reissued May 13, 1919.

14,647.
2 SHEETS—SHEET 1.

Gustav A. Merkt, INVENTOR
BY
R. Anthony Usina ATTORNEY

G. A. MERKT.

RAIL BONDING.

APPLICATION FILED FEB. 15, 1917.

Reissued May 13, 1919.

14,647

2 SHEETS—SHEET 2.

INVENTOR

Gustav A. Merkt,

BY

Anthony Musa

ATTORNEY

UNITED STATES PATENT OFFICE.

GUSTAV A. MERKT, OF WORCESTER, MASSACHUSETTS, ASSIGNOR TO THE AMERICAN STEEL AND WIRE COMPANY OF NEW JERSEY, OF HOBOKEN, NEW JERSEY, A CORPORATION OF NEW JERSEY.

RAIL-BONDING.

14,647. Specification of Reissued Letters Patent. Reissued May 13, 1919.

Original No. 1,154,264, dated September 21, 1915, Serial No. 689,202, filed April 8, 1912. Application for reissue filed February 15, 1917. Serial No. 148,704.

*To all whom it may concern:*

Be it known that I, GUSTAV A. MERKT, a citizen of the United States, residing at Worcester, in the county of Worcester and State of Massachusetts, have invented a new and useful Improvement in Rail-Bonding, of which the following is a specification.

My invention relates to the construction of rail bonds used in connecting the adjoining ends of the track rails of railways, and the invention more particularly relates to the construction of the type of rail bonds used on electric railways in which the terminals of the rail bonds are welded to the surfaces of the rails to which the bonds are applied for use.

Heretofore it has been the practice to bond the adjoining rail ends of the railway tracks by means of copper conductors of various commercial forms. The terminals of such bonds are expanded into or riveted in openings or holes in the track rails, and, with some forms of such rail bonds, the terminals are soldered or welded to the rails.

With such bonds the terminals are applied to the rail heads in some cases, to the flanges of the rails in other cases, in addition to the more general practice of applying the terminals to the web of the rails. The conductors, to the ends of which the bond terminals are attached, have sufficient flexibility to permit the unavoidable movement occasioned by the expansion and contraction lengthwise of the rails.

One object of my invention is to provide a rail bond of improved construction having novel means whereby a larger contact surface is afforded on the bond terminals, the contact intensity is increased, and by which the bond terminals are more securely anchored or united to the rails and liability of loosening of the bond terminals and of mechanical injury to the contacts is lessened and prevented.

Another object of my invention is to provide a rail bond having improved means whereby a perfect union is obtained between the contacting faces of the rails and the rail bond terminals.

The invention also provides a method of securing a good welded connection between the rails, this connection being of the welded type; and this method resulting in a new product, a combination of rails and bonds united in a characteristic and very advantageous relation.

The invention consists in providing a coating or contact on the terminals of the rail bonds, which is formed of a material having substantially the same composition, fusing point and degree of conductivity as that of the rails to which the rail bonds are welded, as in the case of rails composed of steel, to provide the rail bond with terminals having steel surfaces forming contacts engaging with the rails in welding the terminals to the rails; and the invention consists further in the method and product above referred to and in other features set out in the following description and claims.

My invention is applicable to any of the known types of rail bonds in which the terminals are welded to the track rails or secured thereto in an analogous manner.

Figure 2:
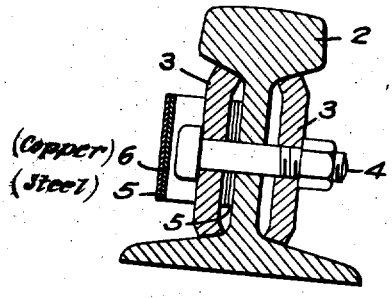
Figure 5:
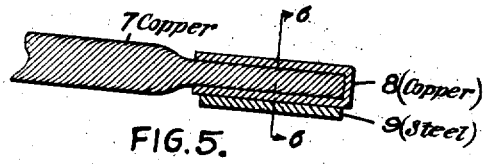
Figure 6:
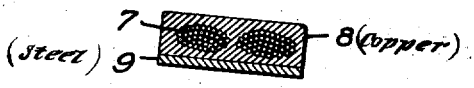
Figure 3:
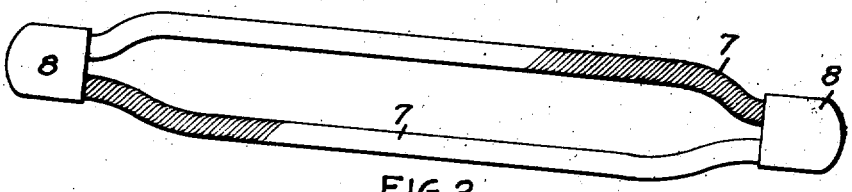
Figure 4:
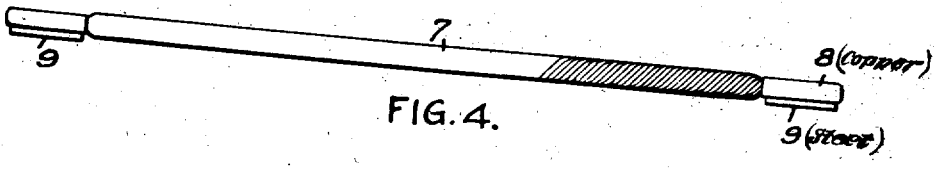
Figure 8:
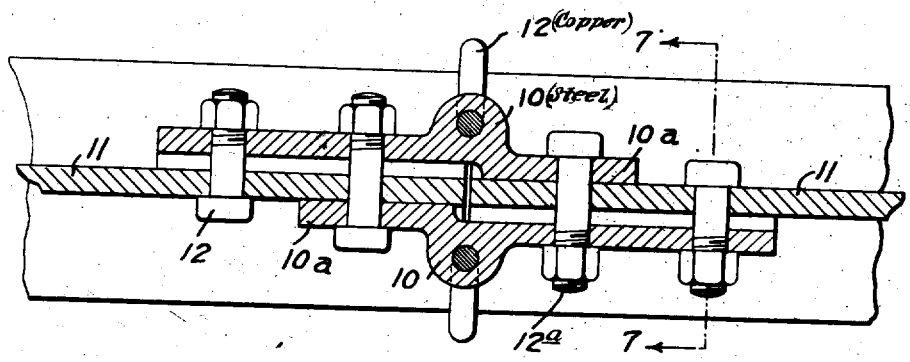
Figure 7:
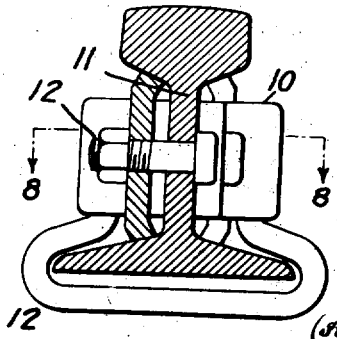
Figure 9:
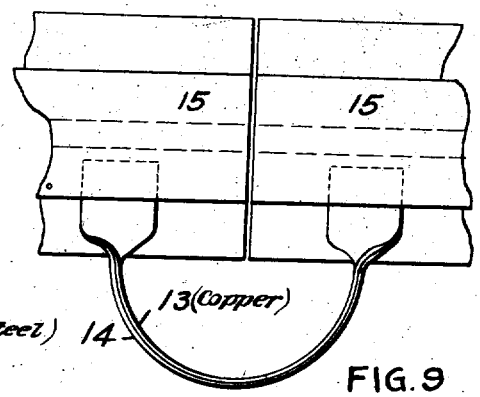
Figure 10:
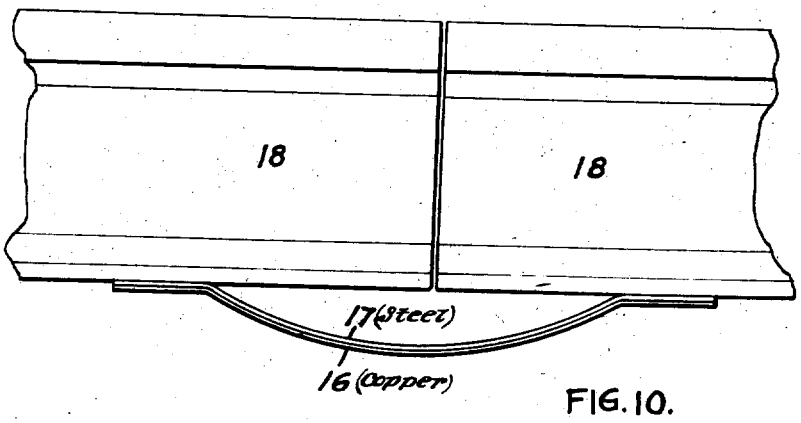

Referring to the accompanying drawings Figure 1 is a plan showing the adjoining ends of the track rails having one form of rail bond constructed and arranged and secured in place thereon in accordance with this invention. Fig. 2 is a transverse section of the same taken on the line 2—2 of Fig. 1. Fig. 3 is a plan showing a modified rail bond construction, having the terminals thereof constructed in accordance with my invention. Fig. 4 is a longitudinal side elevation of the construction shown in Fig. 3. Fig. 5 is a detail sectional side elevation, on an enlarged scale, showing the manner in which the terminals are secured to the conductors and the metal coating is applied to the terminals of the rail bond of Figs. 3 and 4. Fig. 6 is a section on the line 6—6 of Fig. 5. Fig. 7 is a sectional end view of a track rail, showing a splice-bar connected thereto with the rail bond terminals secured to the splice-bar in accordance with this invention. Fig. 8 is a sectional plan, on the line 8—8 of Fig. 7. Fig. 9 is a plan showing the adjoining ends of two track rails, with a rail bond applied to the upper faces of the rail flanges. Fig. 10 is a side elevation showing a rail bond constructed in accordance with my invention as applied for use to the lower face of the rail flanges in bonding the track rails.

In the drawings referring to Figs. 1 and 2, the numeral 2 designates the ends of two track rails which are secured together by means of splice bars 3, 3, and bolts 4, and which have a rail bond secured thereto in accordance with my invention. In the form of rail bond shown in these figures a steel ribbon 5 is united with a copper or aluminum ribbon 6 preparatory to attaching the rail bond to the rails. The ends of the conductor formed by the ribbons 5 and 6 are curved or bent so as to bring the steel ribbon 5 thereof with the steel faces of the rail bond in engagement with web of the rails 2. The bonds which are formed in a separate process prior to being applied for use in the track, are then united to the rail webs by welding. In this way, the surfaces of the rail bond contacting with the rails are of substantially the same composition as the rails and having substantially the same electrical conductivity, which permits of the parts being easily heated to the same temperature in welding the parts to attach the rail bond in place on the rails.

In the construction shown in Figs. 3, 4, 5 and 6, a well known form of rail bond is shown in which strands 7 formed of copper wire are connected at their ends to additional bodies of copper constituting terminals 8 which have a steel plate 9 united thereto by welding or fusing, this plate forming the face of the terminals contacting with and welded to the rail when applied for use, the plate 9 being the same in composition and degree of electrical conductivity as the rail to which the rail bond is supplied.

In the construction shown in Figs. 7 and 8, a rail bond is applied to the splice bars which connect the rails and in this construction the splice bars 10 are bolted to the flanges 11 of the rails, one end of each splice bar 10 being bolted in contact with the web of one rail with the edges of the other end of the splice bar in engagement with the top surface of the rail flange and the under inclined surface of the rail heads. The rail bond conductor in this construction is formed of a copper wire or rod 12, one end being connected to each of the splice bars 10, as will be seen by reference to Figs. 7 and 8. In this construction the splice bars 10 form the terminals of the rail bond and the ends $10^a$ of these splice bars are welded to the web of the rail, the bolts $12^a$ being employed to secure the other end of the splice bars 10 to the rail flanges. In this construction it will be seen that the rails can expand lengthwise and at the same time a perfect connection is formed and maintained by the rail bond between the rails as the ends $10^a$ of the splice bars are welded to the rails.

In the construction shown in Fig. 9 a rail bond is shown having a conductor comprising a ribbon 13 formed of aluminum or copper which is welded or otherwise united with a steel ribbon 14 preparatory to applying the rail bond for use in electrically connecting the ends of the rails 15. In this construction the ends of the ribbon which form the bond terminals are applied to the upper surface of the rail flange with the steel surface of the bond in contact with the rail.

In the construction shown in Fig. 10 a rail bond having a conductor formed of copper or aluminum ribbon 16 with a steel ribbon 17 is employed, the ends of the conductor forming the terminals being secured to the under surface of the flanges of the rails 18, and the steel surface of the ends of the bond which forms the terminals being welded to the rails.

From the above description it will be seen that in all cases the rail bonds are provided with a terminal formed of steel or a terminal having a surface formed of metal of the same composition and electrical conductivity as the metal forming the rails which are to be united by the rail bonds.

I believe myself the first to discover and disclose the advantages of providing the terminals of rail bonds with a coating or covering of metal which is united to the terminals and is of the same composition or electrical conductivity as the rails to which the rail bonds are applied, and I intend to claim such construction broadly.

Although in each of the cases illustrated and described above the copper bonds have their terminals coated with or provided with a surface portion of steel which is substantially or approximately of the same composition as the rail; yet it will be understood that the word "steel" is used to include compositions generally containing the same ingredients, chiefly iron and carbon, but of widely varying percentages. It is practically impossible to know the percentage composition of the rails which one is called on to bond, or to provide bonds with steel portions on the end identical in percentage composition with the rails on which they are to be used. In fact, for convenience in manufacturing the bonds the steel used will generally be of a standard composition or carbon percentage and will, in most cases, correspond only approximately to the rails on which they are used.

Again, I believe myself to be the first to discover and disclose the advantages of first providing either one of the principal elements to be welded together, (the rail and the bond respectively) with a welded coating or body of the metal which the other element is composed of and then welding the one of said elements to the said coating or body of the same metal on the other. This produces a much better union than has been obtainable heretofore with the usual methods of welding, as, for example, by the heat of a field oxy-acetylene blow torch; and provides a process which is extremely simple to practice and can be performed quickly and cheaply.

Where it has been attempted heretofore to weld a copper bond directly to the steel rail, a practically insuperable difficulty has arisen because of the high temperature necessary to bring the steel to a welding heat and the greater fusibility of copper as compared with steel. It has been impossible to bring steel, in the space directly opposite to the bond terminal, to a white heat without causing the copper to melt and run away. But where the two parts which face each other are of the same metal, as the steel in the specific case illustrated therein, the same temperature will bring the two of them to a white or welding heat at the same time, without melting either of them sufficiently to interfere with the making of a good bond. The same difficulty does not arise in the applying of a steel coating to the bond terminal since this work is done in the shop and the two metals may be cast one on top of the other in a mold which prevents the copper from running away.

In attempts which have been made to weld a copper bond terminal directly to the side face of the steel rail the inner or adjacent faces of the rail and bond have not been welded directly to each other for the reasons above stated. The union has been effected by simply feeding molten copper to the top of the bond terminal and the side face of the rail. This merely conceals a poor joint beneath a good looking top surface and usually there is an actual space, thick enough to form a substantial air gap, between the rail and the inner face of the bond terminal.

What I claim is:

1. A rail bond comprising a conductor and terminals on the ends of the conductor, said terminals being coated with metal of the same chemical composition, having the same fusing point and having the same electrical conductivity as the metal in the rails to which the bonds are applied, the metal coating of the terminals being united therewith, and directly welded to the track rails.

2. A rail bond for electrically bonding the adjacent ends of steel rails and designed to be welded thereto, said bond being of copper and having a terminal comprising a comparatively thin steel plate having a forward face fitting a face of the rail to which it is to be welded and having immediately opposite a flat rear face united by welding to the bond.

3. A rail bond for electrically bonding the adjacent ends of steel rails, said bond being of separate strands of metal of greater conductivity than steel and having a terminal comprising the combination of a plate of ferrous metal having a forward face adapted to be united by welding to a face of the rail and an additional body welded on another face of said body of ferrous metal and on the end of the bond and being also of metal of greater conductivity than steel.

4. A rail bond for electrically bonding the adjacent ends of steel rails and designed to be welded thereto, said bond being of copper and having a terminal comprising an additional body of copper and a steel plate having one face fitting a face of the rail to which it is to be welded and having its opposite face welded to said additional body of copper.

In witness whereof, I have hereunto signed my name.

GUSTAV A. MERKT.